United States Patent [19]
Chevroulet et al.

[11] Patent Number: 5,735,338
[45] Date of Patent: Apr. 7, 1998

[54] CONTROL DEVICE FOR A VEHICLE AIR-CONDITIONING SYSTEM

[75] Inventors: Tristan Chevroulet, Norwich, Great Britain; Jian A. Piccolo, La Chaux-de-Fonds, Switzerland

[73] Assignee: SMH Management Services AG, Biel, Switzerland

[21] Appl. No.: 389,418

[22] Filed: Feb. 16, 1995

[30] Foreign Application Priority Data

Feb. 22, 1994 [FR] France ................... 94 01981

[51] Int. Cl.$^6$ ........................................ F25B 29/00
[52] U.S. Cl. .................. 165/42; 165/43; 237/12.3 A; 237/12.3 B; 180/65.1; 219/202
[58] Field of Search .................. 165/42, 43, 41; 237/12.3 A, 12.3 B; 180/65.1; 219/202

[56] References Cited

U.S. PATENT DOCUMENTS

| | | | |
|---|---|---|---|
| 2,780,077 | 2/1957 | Jacobs | 165/43 |
| 2,796,820 | 6/1957 | Moore et al. | 165/43 |
| 3,496,855 | 2/1970 | De Boer | 165/42 |
| 4,560,103 | 12/1985 | Schulz et al. | 236/13 |
| 4,566,531 | 1/1986 | Stolz | 165/42 |
| 4,616,693 | 10/1986 | Dietzsch et al. | 165/41 |
| 5,280,852 | 1/1994 | Dauvergne | 237/123 A |
| 5,505,251 | 4/1996 | Sarbach | 165/42 |

FOREIGN PATENT DOCUMENTS

| | | | |
|---|---|---|---|
| 0214605 | 3/1987 | European Pat. Off. | |
| 504653 | 9/1992 | European Pat. Off. | 165/42 |
| 990800 | 5/1949 | France | |
| 2379392 | 10/1978 | France | 165/43 |
| 2629022 | 9/1989 | France | |
| 3229866 | 2/1984 | Germany | 165/43 |
| 468757 | 1/1952 | Italy | 165/43 |
| 962037 | 9/1982 | U.S.S.R. | 165/43 |

OTHER PUBLICATIONS

Patent Abstracts of Japan vol. 7, No. 271 (M-260) (1416) 3 Dec. 1983 & JP-A-58 149 818 (Diesel Kiki) 6 Sep. 1983.

*Primary Examiner*—John K. Ford
*Attorney, Agent, or Firm*—Griffin, Butler Whisenhunt & Szipl

[57] ABSTRACT

An air conditioning unit for a vehicle is inserted between an inlet conduit (12), supplied with fresh air and/or recycled air, and the passenger space of the vehicle. The unit comprises a fan (16) which supplies two conduits placed parallel, of which one (19) permanently heats the air by contact with a heating component (21, 22), the heated air being dispatched either into the passenger space, or towards the exterior with the aid of a valve (25). The other conduit (20) is opened or closed by a valve (27), according to whether one wishes to cool or to heat the passenger space. The heating component (21, 22) is thus permanently cooled, both when the passenger space is heated and when it is cooled.

10 Claims, 2 Drawing Sheets

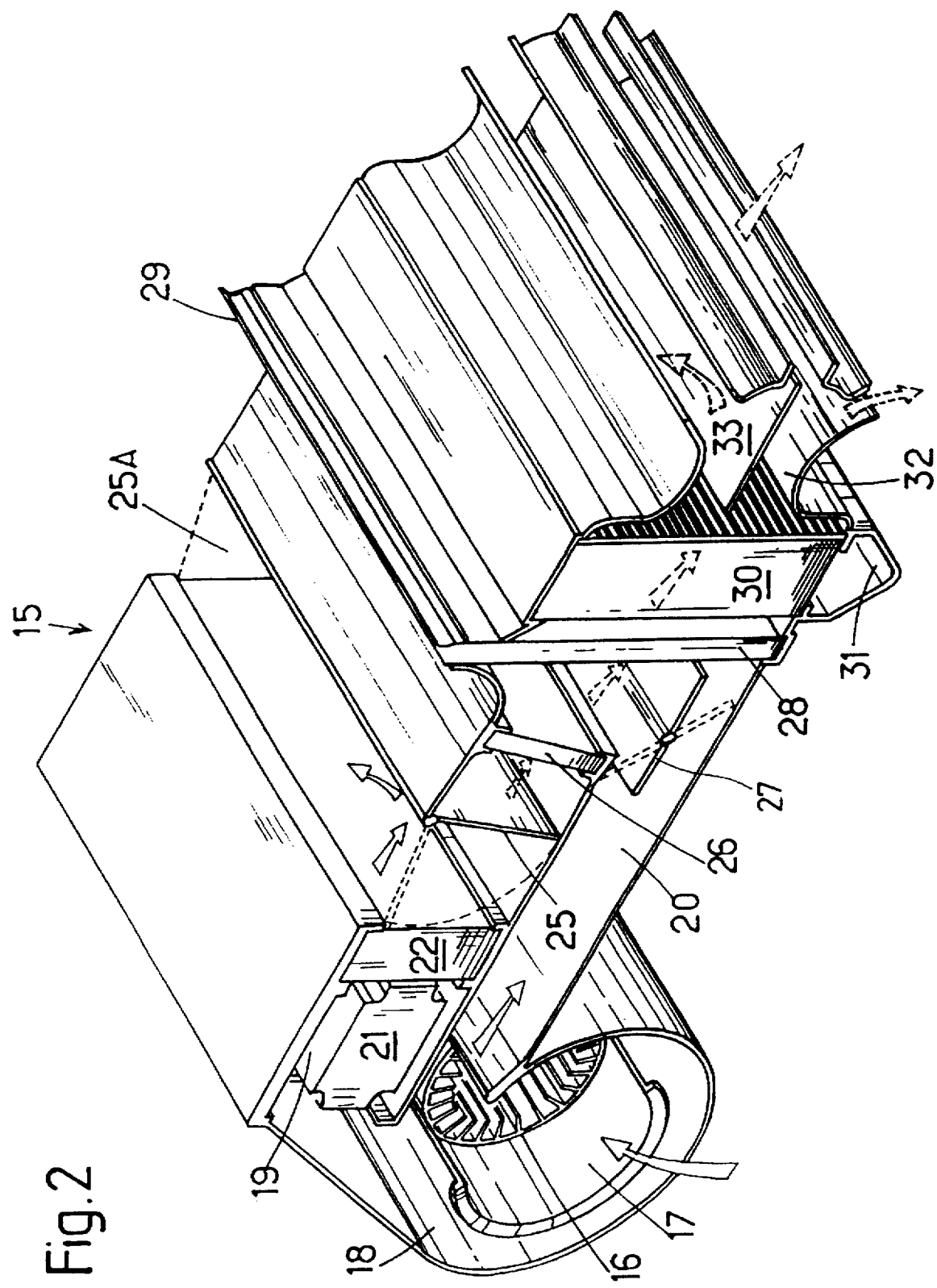

CONTROL DEVICE FOR A VEHICLE AIR-CONDITIONING SYSTEM

FIELD OF THE INVENTION

The present invention relates to a control device for a vehicle air-conditioning system.

BACKGROUND OF THE INVENTION

Vehicle air-conditioning systems are numerous and varied. The majority of them use, for heating, the heat released by certain elements of the vehicle whose temperature one wishes to avoid becoming excessively high. In the case of a combustion engine vehicle, it is the heat released by the engine, which is superabundant, which is used. In an electric motor vehicle, one can use, in addition to the relatively low heat produced by the motor, the heat which is released by the electronic power circuits, the heat released when the brakes are applied and, if necessary, that which is provided by an auxiliary electric radiator.

In order to lower the temperature of the passenger space, it is necessary to provide a refrigerator or air cooling unit, for example in the form of an evaporator of a calorifer fluid circuit. When the air-conditioning operates to lower the temperature the heating means must be isolated from the air-conditioning air circuit. In the case of a liquid-air exchanger or an auxiliary electric radiator, it is sufficient, as a rule, to activate a valve for liquids or an electric switch. Such valves or switches are however more expensive, for the same efficiency and reliability, than valves controlling airflow. Further, control by the user is complicated because of the thermal inertia of liquid.

It will also be noted that, when the passenger space heating is switched off, other means, such as fans must be provided for cooling the elements of the vehicle whose temperature must not rise excessively.

It can thus be seen that the control as a whole of the temperature of the different parts of a vehicle, inside and outside the passenger space, leads to very complex installations.

SUMMARY OF THE INVENTION

A purpose of the invention is to provide an air-conditioning control device which is compact and economical, while ensuring simplification of the combination of means for controlling the temperature of different elements of the vehicle.

In order to obtain this result, the invention provides a vehicle air-conditioning system control device, this system comprising a circuit for introducing air into a passenger space, after having passed it through heating and/or cooling means, the circuit comprising a fan, a valve controlling the discharge of air to the exterior and a valve controlling the admission of fresh air, at least one valve to control the temperature of the air admitted into the passenger space, and a distributer which determines whether this air is introduced by being blown towards the upper, median or lower part of the passenger space, the peculiarity of this device being that it includes, grouped together in a single apparatus, which may be installed and removed in a single block:

said fan a first conduit, connected to the outlet of the fan, containing at least one heat releasing component, and provided with a valve for discharging air, this valve being situated downstream, in the direction of the flow of air from said heat releasing component, a second conduit placed parallel to the first, and provided with a valve capable of obturating it, a common distributer placed at the outlet of the two conduits and being able to direct the air coming out of the first and second conduits towards the passenger space.

If the valve of the first conduit is in a closed position vis à vis the exterior, the heat released by the heating component will be directed towards the passenger space, where it arrives in the form of warm air the temperature of which varies according to the position of the valve of the second conduit.

If the valve of the first conduit is in an open position vis à vis the exterior, the heat released by the heating component will be directed outside, and the passenger space will be isolated from the outside if the valve of the second conduit is closed, and it will receive fresh air if the valve of the second conduit is open.

Thus, the device of the invention fulfils a dual function: 1) to control the ventilation of the passenger space, either by providing it with warm air, or by providing it with fresh air, or by isolating it, and 2) permanently cooling a heating component. The latter, for example, may comprise the electronic power circuits of an electric vehicle. It may also comprise an exchanger intended to discharge the heat recovered when the brakes are applied.

A refrigerator or air cooling unit, which may be a system evaporator operating in accordance with heat pump principles, may be placed in the second conduit. As this type of equipment is often voluminous, it is preferable to place it between the outlet of the two conduits and the common distributer. It may thus occupy the entire width of the device.

Similarly, a filter, which is often a cumbersome component, will also be placed between the outlet of the two conduits and the common distributer. In an advantageous manner, it will be placed upstream, in the direction of the flow of air from the evaporator, to limit the risk of dirtying the latter and to homogenize the airflow.

This also ensures that droplets, originating from condensation on the surface of the evaporator, are prevented from coming into contact with the elements situated upstream from the filter, for example an electric heater.

According to an advantageous embodiment, the device also includes an auxiliary radiator situated in the first conduit, downstream from the valve of the first conduit.

This particular arrangement accords with the fact that, by definition, the auxiliary radiator only comes into operation when heat is lacking, that is to say in a situation where the valve of the first conduit is closed to the exterior. It is preferable that this radiator be outside the air circuit when the device is not used to heat the passenger space.

In an advantageous manner, the valves of the two conduits are coupled in such a way that, when the valve of the first conduit is closed to the exterior, the valve of the second conduit is in an obturating position.

This arrangement has the advantage that, when the passenger space is heated with the aid of the first conduit sources of heat, wasteful energy consumption and a source of noise at the fan position are avoided, by preventing the air from passing into the second conduit. Conversely, in the opposite direction it may be advantageous to be able to isolate temporarily the passenger space from the flow of air passing through the heat releasing components by opening the valve of the first conduit to the exterior.

BRIEF DESCRIPTION OF THE DRAWINGS

The invention will now be explained in more detail with the aid of a practical example, illustrated by the drawings in which:

FIG. 2 is a view in perspective of the device itself, a lateral panel having being removed for greater clarity, this view being partially cut away.

DESCRIPTION OF PREFERRED EMBODIMENTS

Figure 1:
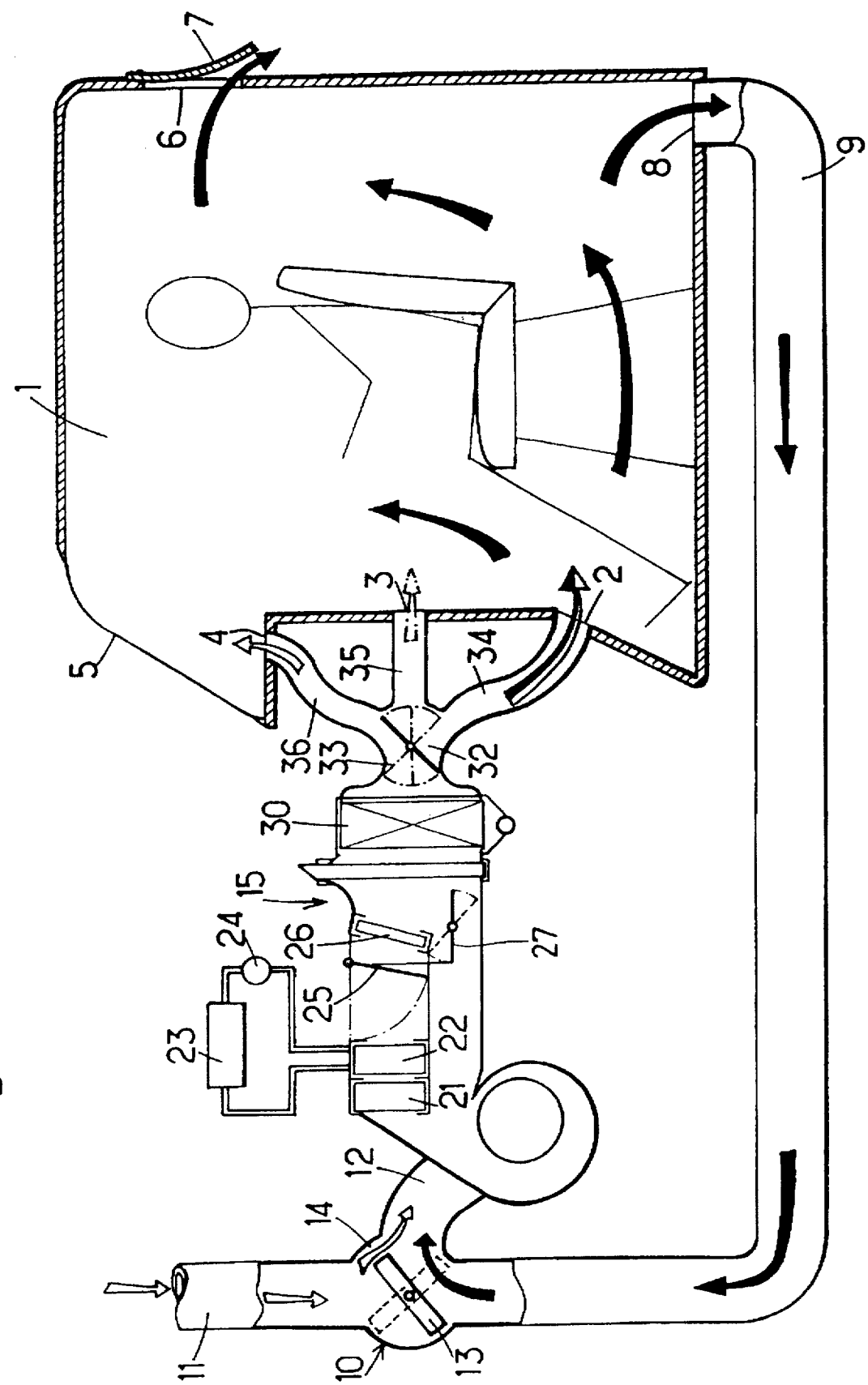
FIG. 1 is an overall view of the air-conditioning of the cab or passenger space of an electric vehicle equipped with a device according to the invention.

FIG. 1 shows the driver's cab 1 or passenger space of a vehicle, represented as a lorry cab. Cab 1 can receive air via an air vent 2, directed towards the lower part of the cab, largely towards the feet of the driver and/or passengers, via another air vent 3, which dispatches air to the median part of the cab, and by a vent 4 which dispatches air for the demisting of the windshield 5 of the vehicle. Of course, these vents may each have several orifices.

The air may exit the cab by an aperture 6 opening onto the exterior and provided with an obturation valve 7 preventing a re-entry of air through said aperture 6, and via an outlet 8 connected to an air recycling conduit 9. Conduit 9 conducts the air to a three way valve 10, which is also connected to a fresh air admission conduit 11, and a conduit 12 intended to dispatch air to cab 1. Three way valve 10 is provided with a flap 13, which may occupy a first position, shown in an unbroken line in the drawing, in which the air coming from recycling conduit 9 is dispatched to cab 1. A by-pass conduit 14 allows, in this case, partial admission of fresh air into conduit 12. Flap 13 may occupy a second position, shown in a dotted line in the drawing, in which conduit 9 is closed, and the cab is then supplied solely with fresh air. Flap 13 may also occupy intermediate positions.

The vehicle may be devoid of recycling conduit 9. In this case, conduit 12 is supplied solely with fresh air.

Between conduit 12 and air vents 2, 3 and 4, a device according to the invention is inserted, which will be described in more detail with the aid of FIG. 2. The air-conditioning device, designated as a whole by the reference 15, includes an outward-flow blower 16, whose inlet 17 is connected to conduit 12, and whose outlet 18 is connected to two parallel conduits: a "hot" conduit 19 and a "fresh" conduit 20. In "hot" conduit 19 is inserted first a unit 21 which includes the electronic power circuits which control the electric motors (not shown) of the vehicle. It is known that this circuit dissipates several hundred watts. The airflow, after having cooled the electronic components contained in chassis 21, passes through a water-air exchanger 22. This exchanger receives hot water from a braking energy discharge circuit. This circuit includes a heating component 23, comprising of a vessel in which heater elements are immersed, connected to the vehicle's motor, and which receive the electricity produced by said motor when the brakes are applied. In vessel 23, the energy from the heater elements is transmitted to the water, which circulates between said vessel and exchanger 22, thanks to a pump 24, see FIG. 1.

Downstream from exchanger 22 is placed a mobile flap 25. This mobile flap can occupy a first position, shown in an unbroken line in the drawing, in which the air current, which is heated on contact with chassis 21 and exchanger 22, is prevented from continuing in the direction of the vehicle cab, and exits to the exterior through an opening in the wall of the device. In another position, shown in a dotted line, flap 25 closes opening 25A, and directs the heated air towards the cab. When flap 25 is in this position, the hot air passes through an auxiliary electric radiator 26. It then joins "fresh" conduit 20.

"Fresh" conduit 20 directly conducts the air from outlet 18 of the fan, to the point where hot conduit 19 and fresh conduit 20 meet. At this point, a rotating flap 27 is installed to occupy a first position, in which it enables the fresh air coming from conduit 20 to continue on its route, and a second position, shown in a dotted line, in which conduit 20 is obturated. Flap 27 is arranged so as not to obturate the outlet of hot conduit 19. It will be noted in this regard that flap 27 is coupled to flap 25 so that the latter is obturated when flap 27 allows air to pass. It will also be noted that between the two extreme respective positions of flaps 25 and 27, the latter may occupy intermediate positions (not shown).

On the other side of flap 27 a filter 28 is placed across the device. Filter 28 may be traversed by the air coming from hot conduit 19 as well as fresh conduit 20. It is arranged so as to be detachable, thanks to the fact that its upper edge 29 is formed to constitute a meshing element. On the other side of filter 28 is an evaporator 30, into which a cooling fluid in a liquid state is sent, this fluid cools the hot air by depression vaporizing, in accordance with a technique well known to a man skilled in the art. Of course, evaporator 30 is not supplied when one wishes to raise the temperature of the cab. A gutter 31 is provided under evaporator 30, so as to recover the condensation water formed by the cooling of the air. The water recovered in gutter 31 is then discharged to the exterior.

The outlet of evaporator 30 is connected to a distribution chamber 32, equipped with a distributer flap 33. This distributer flap 33 enables fresh air to be dispatched at will to air vents 2, 3 and 4 with the aid of conduits 34, 35 and 36, as can be seen in FIG. 1.

The combination of elements of the device are enclosed in a case, for example in a plastic material such as a polypropylene charged with particles of talc. In FIG. 2, the device is shown with a lateral wall assumed to be removed, in the interests of clarity. The device as a whole unit thus comprises a detachable block, easy to install and remove.

What is claimed is:

1. An air-conditioning system control device for conditioning air supplied to a passenger space of a vehicle, said device comprising:

a fan having an outlet;

a first conduit connected to the outlet of the fan, said first conduit containing at least one heat releasing component and having an outlet at its downstream extent in the direction of air flow;

an opening in said first conduit downstream in the direction of air flow from said at least one heat releasing component, said opening communicating with the exterior of both said device and said passenger space;

a first valve in said first conduit for selectively directing air flow out of said opening while blocking air flow to said passenger space, or blocking air flow through said opening while permitting air flow to said passenger space;

a second conduit connected in parallel with said first conduit to the outlet of said fan, said second conduit having an outlet at its downstream extent in the direction of air flow and a second valve for at least partially blocking air flow through said second conduit;

a common distributer disposed downstream of the outlets of the first and second conduits for selectively directing air from the outlets of the first and second conduits toward an upper part and a lower part of said passenger space;

said fan, said at least one heat releasing component, the first and second conduits, the first and second valves and said common distributer being grouped together in a single apparatus which may be installed and removed in a single piece.

2. A device according to claim 1 wherein the vehicle is an electric vehicle comprising electric motors and electronic power circuits of said motors, said at least one heat releasing component comprising a heat exchanger releasing the heat of said electronic power circuits.

3. A device according to claim 1, wherein a filter is placed between the outlets of the first and second conduits and the common distributer.

4. A device according to claim 1, wherein the vehicle is an electric vehicle comprising electric motors and electronic power circuits of said motors, said at least one heat releasing component comprising said electronic power circuits.

5. A device according to claim 1 wherein the vehicle is an electric vehicle with brakes, said at least one heat releasing component comprising an exchanger for discharging the heat recovered from the brakes when they are applied.

6. A device according to claim 1 and further comprising an auxiliary radiator situated in the first conduit, downstream from the first valve.

7. A device according to claim 1, wherein the first and second valves are coupled in such a way that, when the first valve is closed to the exterior, the second valve is in an obturating position.

8. A device according to claim 1, wherein an evaporator is placed between the outlets of the first and second conduits and the common distributer.

9. A device according to claim 2, wherein a filter is placed between the outlets of the first and second conduits and the common distributer.

10. A device according to claim 9, wherein the filter is placed upstream, in the direction of the flow of air, from the evaporator.

* * * * *